UNITED STATES PATENT OFFICE.

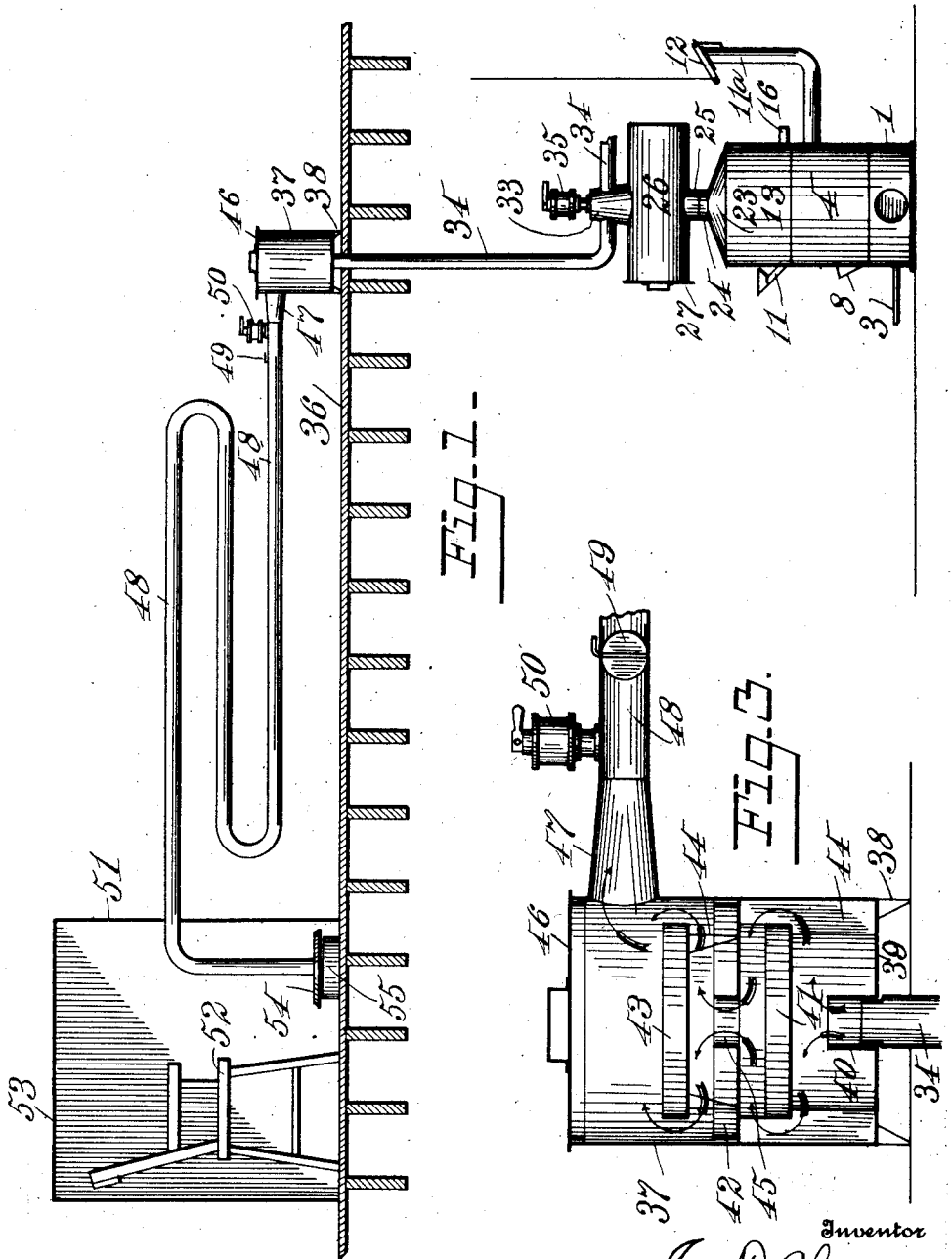

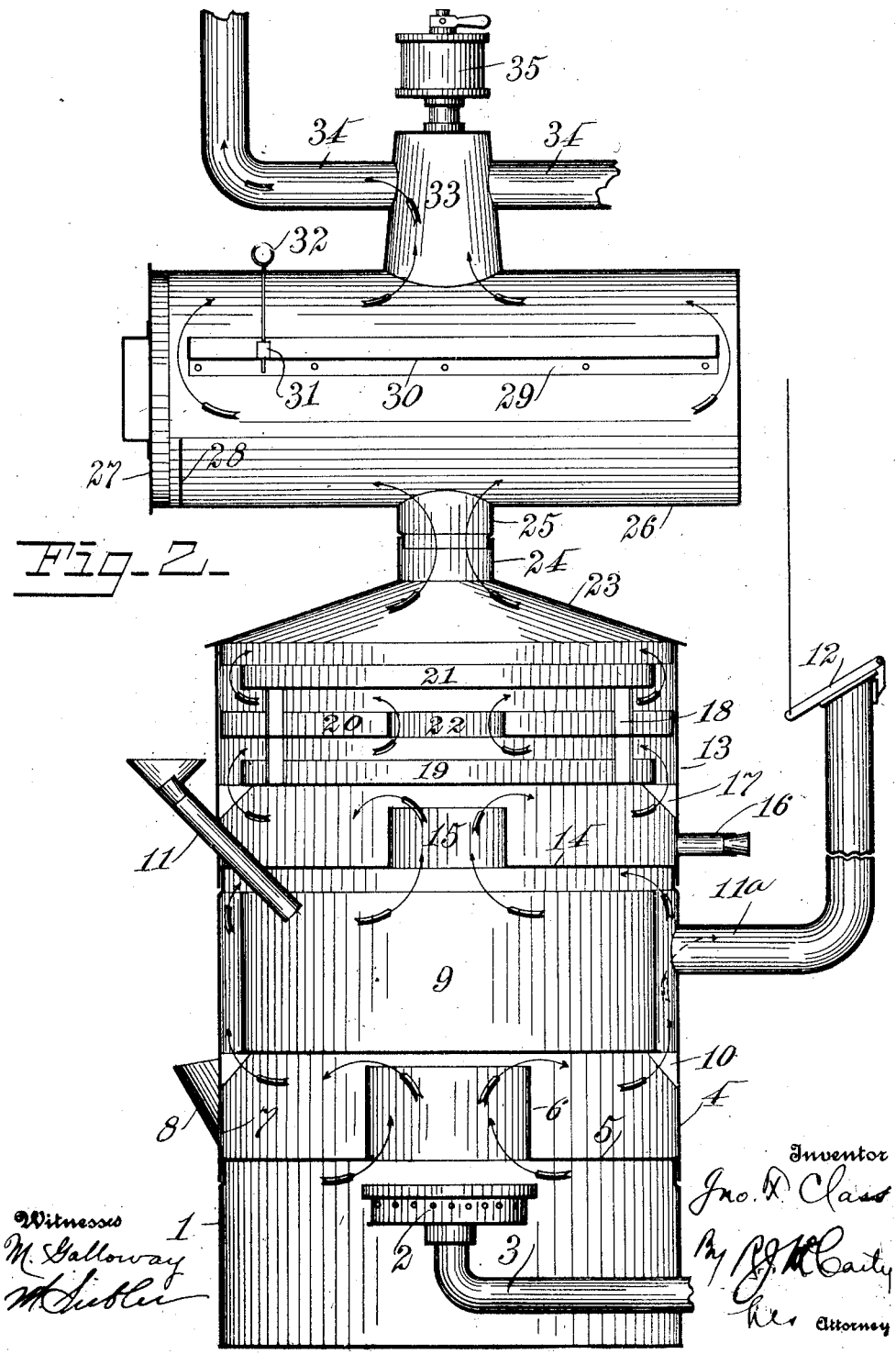

JOHN F. CLASS, OF DAYTON, OHIO.

MEDICINAL-VAPOR GENERATING AND FUMIGATING APPARATUS 1,223,032.      Specification of Letters Patent.      Patented Apr. 17, 1917.

Application filed September 11, 1916. Serial No. 119,393.

*To all whom it may concern:*

Be it known that I, JOHN F. CLASS, a citizen of the United States, residing at Dayton, in the county of Montgomery and State of Ohio, have invented certain new and useful Improvements in Medicinal-Vapor Generating and Fumigating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in medicinal vapor generating and fumigating apparatus and comprises certain improvements of the apparatus shown and described in my patent of April 18, 1916, No. 1,180,241. The object of the invention is to provide an apparatus of this character which is simple in construction, efficient in operation and effectually generates and transmits chemically charged fumes to points or places of application. Another object of the invention is to provide an apparatus of this character which may be used in connection with a fume or vapor bath cabinet whereby patients may be treated through the agency of fumes generated thereby.

Referring to the drawings, Figure 1 is an elevation of a complete installation of my fume or vapor generating apparatus and the apurtenances necessary when using the apparatus in connection with a vapor bath cabinet; Fig. 2 is a longitudinal vertical section through the fume or vapor generator proper; and Fig. 3 is a longitudinal section through the auxiliary fume or vapor generator.

In the specification and drawings, similar reference characters indicate corresponding parts.

Referring more particularly to the drawings, 1 represents the base section of the generator proper in which is mounted a burner 2 supplied with fuel by a pipe 3 which pipe may be provided with any well known type of regulator. Mounted upon the base section 1 and above the burner 2 is an intermediate section 4 provided with a bottom 5 and a central tube 6 directly above the burner 2.
The parts 4, 5 and 6 form a pan adapted to receive one of the chemicals forming a constituent of the fume or vapor. Section 4 is provided with a side opening 7 through which the liquid or chemical may be introduced to the pan by the aid of a funnel or spout 8. Mounted within the section 4 and above the tubular portion 6 is a pan 9 which is supported upon brackets 10. The pan 9 is also adapted to receive a liquid or chemical constituent of the fume or vapor. The pan 9 may be filled through a funnel 11 and from the pan 9 the liquid overflows into pan 4 and discharges through spout 8. The products of combustion and a certain amount of air in a heated condition pass upwardly through the tubular portion 6 and around the pan 9, as indicated by the arrow, thereby generating steam from the water in the pans and fumes from the chemicals dissolved in the water. The section 4 is provided with a vent pipe $11^a$ provided with a damper 12 which may be opened to permit the products of combustion of the burner 2 to escape to the atmosphere when it is desired to place the apparatus out of operation. Mounted above the intermediate section 4 is an upper section 13 provided with a bottom 14 having a central tube 15. The section 13, the bottom 14 and the tube 15 provide a pan adapted to receive suitable chemicals and which is provided with a drain spout 16. Mounted within the section 13 and resting upon brackets 17 and supports 18 are three shallow pans 19, 20 and 21. The intermediate pan 20 is provided with a central tubular portion 22 through which the air, the products of combustion and the fumes may pass. After passing around the pan 9, as shown by the arrows, the gaseous fumes pass through the tubular portion 15 around the outer edge of the pan 19 through the tubular portion 22 and around the outer edge of the pan 21. The pans 19, 20 and 21 are adapted to receive mineral substances, and the fumes when passing around, through and over the pans extract the virtue from said substance which is incorporated with the fumes. Mounted upon the section 13 is a cap or lid 23 having a central discharge spout 24 through which the fumes pass out of the generator. Adapted to be received by the spout 24 is a spout 25 on the lower side of a horizontally disposed generating drum 26. The generating drum 26 is provided with a removable head 27 and a plate 28 which forms a pan at the bottom of the drum 26 to prevent any escape of the contents. Mounted within the drum 26 are ledges 29 which support a shallow pan 30. The pan 30 is of less length than the drum 26 which permits the fumes to pass around the ends of the pan, as is shown by the arrows. The pan 30 is adapted to receive chemicals which are absorbed by the fumes as they pass through the drum. The pan 30 is also provided with a drain opening which is normally closed by a valve 31 adapted to be opened by a finger piece 32 on the outside of the drum. The valve 31 permits any liquids accumulating in the pan to be drained into the bottom portion of the drum 26. The drum 26 is provided with a discharge dome 33 on its upper side and from which laterally extend tubes 34 which lead to the point of application of the fumes. In some instances it may be desirable to eliminate the use of the drum 26 in which case the tube 24 may be directly connected with the tube 34. In the present instance, there is shown two discharge tubes 34 but it will be understood that one or any number of said tubes may be provided to carry the fumes to various places for application. Mounted upon the dome 33 is a cup 35 which receives a suitable chemical such as carbolic acid or any other suitable chemical and which is adapted to permit said acid to drip through the dome 33 and on to the pan 30. The chemical within the cup 35 is utilized in charging the fumes with its medicinal and disinfecting properties. The generator, as above described, when used in connection with a bath cabinet is conveniently placed in the cellar of the sanitarium in which the apparatus is used and the tubes 34 may be extended upwardly and through a floor 36, as is shown in Fig. 1. After passing through the floor 36 each tube 34 conducts the previously generated and charged fumes into a second generator 37 which strengthens and purifies the fumes. The generator 37 is of cylindrical form and is supported upon the floor 36 by any suitable means such as feet 38. The generator 37 is provided with a bottom 39 and a central tube 40 which receives the upper end of its respective tube 34. The lower portion of the outer wall of the generator 37, the bottom 39 and the tube 40 form a vessel or pan adapted to receive the liquid discharge and thereby relieve the fumes of unnecessary moisture. Mounted within the generator 37 above the tube 40 are three pans 41, 42 and 43. The aforesaid shallow pans are supported in proper position by brackets 44. The intermediate pan 42 is provided with a central tube 45 which permits the fumes to pass through said pan. The upper and lower pans 41 and 43 are of smaller diameters than the inside of the generator 37 thereby permitting the fumes to pass around the outer edges of said pans. The pans 41, 42 and 43 are adapted to hold chemicals which are instrumental in charging the fumes with their chemical properties. The generator 37 is provided with a removable lid 46 which permits access to be had to the interior thereof. The fumes pass out of a generator 37 through a funnel-shaped discharge spout 47 which communicates with a tube 48. The tube 48 may be of any length to purify and strengthen as well as to remove undue moisture from the fumes. The tube 48 is provided with a damper 49 which provides for the regulation of the fumes in their passage. The tube 48 is also provided with a cup 50 mounted thereon adjacent to the generator 37, said cup being adapted to receive a suitable liquid chemical and to permit the same to drip into the tube 48. As the fumes from below pass through they will be picked up and given the proper strength. The fumes, after passing out of the generator 37, may be directly conducted to the point of application or use or may be transmitted through the tube 47, which is shown to be elongated in the present instance. The object in providing an elongated tube 48 is to permit the fumes to be affected by coming in contact with an enlarged surface exposed to the atmosphere which has a cooling effect. It has been found from extensive experiments that the vapor or fumes have a certain desirable effect which is apparently attributable to the reduced temperature thereof as compared with the temperature given them in the main vapor generator. It will also be understood that the application of heat is not always necessary for the purpose of generating vapor, as it is well known that currents of air will have a vaporizing effect on certain chemicals. It is thought, however, that the application of heat in the main vaporizing generator is desirable where the apparatus is such as to decrease the temperature of the vapor before it enters the cabinet. The tube 48 is, in the present instance, extended into a vapor bath cabinet 51 adapted to rest upon the floor 36 and which is large enough to contain a chair 52 upon which a patient may sit. The cabinet 51 is provided with an opening 53 directly above the chair 52 through which the head of the patient may extend. After passing through the cabinet 51, the tube 48 extends downwardly and on its lower end is provided with a deflecting shield 54 which deflects the fumes into a pan 55 adapted to receive suitable chemicals which are absorbed by the fumes. After passing over the chemicals in the pan 55, the fumes are diffused throughout the cabinet where they come in contact with the body of the patient and are received by the pores of the skin.

Having described my invention, I claim:

In an apparatus of the character specified, a main vapor generator comprising a base section having a heat medium within it, a section thereabove having two compartments adapted to contain fume generating material, one of which has a central communication with the base section, and the other of which has a marginal communication with the first-named compartment, an upper section surmounting the first-named section and having within it a plurality of shallow receptacles adapted to contain fume generating material and over and around which the fumes arising from the lower compartments circulate and commingle with the fumes arising from said shallow receptacles, a horizontal drum mounted above said upper section and having a communication therewith and having within it a shallow receptacle adapted to contain fume generating material and over and around which the circulating fumes from below pass in a strengthened state, an auxiliary generator receiving the fumes at a reduced temperature from said drum and in which the fumes are further strengthened, and a pipe connection through which the fumes are conducted from said auxiliary generator to the place of application, substantially as specified.

In testimony whereof I affix my signature, in presence of two witnesses.

JOHN F. CLASS.

Witnesses:
 MELLIE GALLOWAY,
 MATTHEW SIEBLER.